United States Patent [19]

Kremer et al.

[11] Patent Number: 5,090,763
[45] Date of Patent: Feb. 25, 1992

[54] TRUCK BED LINER

[75] Inventors: Richard Kremer; Stephen R. Wood, both of Bloomingdale, Ind.

[73] Assignee: Futurex Industries, Marshall, Ind.

[21] Appl. No.: 725,282

[22] Filed: Jul. 3, 1991

[51] Int. Cl.⁵ .............................................. B60R 13/01
[52] U.S. Cl. .................. 296/39.1; 276/39.2; 410/121
[58] Field of Search .......................... 296/39.1, 39.2; 410/121, 122

[56] References Cited

U.S. PATENT DOCUMENTS

| D. 271,009 | 10/1983 | Fishler | 296/39.2 X |
|---|---|---|---|
| 4,717,298 | 1/1988 | Bott | 410/129 |
| 4,750,776 | 6/1988 | Barben | 296/39.2 |
| 4,767,149 | 8/1988 | Rye | 296/39.1 |
| 4,887,947 | 12/1989 | Bott | 410/144 |
| 4,944,612 | 7/1990 | Abstetar et al. | 296/39.1 |
| 4,955,771 | 9/1990 | Bott | 410/94 |
| 4,958,876 | 9/1990 | Diaco et al. | 296/39.2 |
| 4,991,899 | 2/1991 | Scott | 296/39.2 |

Primary Examiner—Dennis H. Pedder
Attorney, Agent, or Firm—Baker & Daniels

[57] ABSTRACT

The invention comprises a truck bed liner for a vehicle cargo bed including a liner floor and four support members which are formed from the liner floor and protrude upward from the liner floor. Two pairs of support members are positioned such that a restraining member may be placed between the right support members and the left support members. The restraining member is held in place by the support members and therefore compartmentalizes the cargo area and provides a mechanism to restrict or inhibit the movement of small or oddly shaped items within the cargo bed without reducing the width of the interior cargo area.

9 Claims, 6 Drawing Sheets

TRUCK BED LINER

FIELD OF THE INVENTION

This invention relates to truck bed liners, and, in particular, to protective truck bed liners including support members formed from the floor of the liner for supporting cargo restraining members.

BACKGROUND OF THE INVENTION

During recent years, pickup trucks have gained popularity as a form of family transportation as they are able to transport both passengers and cargo. If the truck is being used to carry cargo, truck bed liners are often installed to protect the metal surfaces of the truck bed from scratches and dents which may lead to rust and which affect the aesthetic appearance of the bed. Some liners, as disclosed in U.S. Pat. No. 4,162,098, protect only the floor of the truck bed; some, as disclosed in U.S. Pat. No. 4,245,863, protect only the side walls of the bed; and most protect the floor, the end wall, both side walls, and the tailgate. Various materials such as wood (U.S. Pat. No. 4,505,508), vinyl (U.S. Pat. No. 4,279,439), and plastic (U.S. Pat. No. 4,693,507), are used in the manufacture of truck bed liners, and some, such as those disclosed in U.S. Pat. Nos. 4,505,508, 4,893,862, 4,944,612 and 4,986,590, are multi-piece liners, while most have a unibody construction. The most common truck bed liner is made of a plastic material formed for a custom fit of various makes and models of pickup trucks. For example, the liner disclosed in U.S. Pat. No. 4,693,507 includes protection of the tailgate in its unitary construction, while the liners disclosed in U.S. Pat. Nos. 3,814,473, 4,047,749 and 4,111,481 and 4,958,876 use a separate liner to protect the tailgate.

The bed of the truck may also be used for the attachment of a camper top or cap in addition to carrying cargo in the open truck bed. To accommodate both uses, some liners, such as those disclosed in U.S. Pat. Nos. 4,681,360, 4,768,822 and 4,824,158, are used together with a camper top, and the truck bed liner disclosed in U.S. Pat. No. 4,875,731 is used as a bed liner or inverted and also used as a camper top.

The wide variety of truck bed liners available for a multitude of truck makes and models are able to sufficiently protect the truck bed from scratches and dents that could be created by carrying cargo in the bed, and many may be used with a camper top or cap to provide the owner with versatility in the use of the truck. However, the size of the cargo may pose difficulties in carrying some items. One such problem is encountered when handling items which are large enough that they do not rest on the floor of the truck bed. For example, a 4'×8' sheet of plywood often will not lie flat on the floor of a compact pickup truck's cargo bed. Although the internal width of the compact truck bed is greater than 4', the width of the bed between the truck's wheel wells is less than 4'. To solve this problem, U.S. Pat. No. 4,767,149 discloses a liner with support elements that permit the placement of a shelf at a level at or just above the height of the wheel well. If such a liner is used with a compact pickup truck, a 4'×8' sheet of plywood could rest flatly on the shelf.

Another problem is encountered when carrying smaller items or items of odd shapes in the cargo bed. Although the materials and construction of liners absorb the shock of moving cargo, truck bed liners have been developed which provide mechanisms which inhibit the movement of cargo within the bed. These cargo restraint systems compartmentalize the bed in order to limit or restrict movement of smaller or oddly shaped cargo by providing a support means for the placement of a restraining member parallel to the front end of the bed and the tailgate. Some of these systems, such as those disclosed in U.S. Pat. Nos. 4,717,298, 4,887,947 and 4,955,771, are separate from the bed liner and hence are generally more expensive. Other systems, such as those disclosed in U.S. Pat. Nos. 4,887,947, 4,958,876 and 4,991,899 are integral with the bed liner. Generally, recesses or slots of appropriate sizes are formed into the side walls of the bed liner to hold a restraint, such as a 2"×4", which further compartmentalizes the bed of the truck and/or provides a member to which cargo can be secured, both of which may prevent the movement of cargo within the bed of the truck. Support members molded into the form of the truck bed are often preferred as they are ready at any time to be used without requiring any additional assembly.

One disadvantage of these side wall systems is the loss of area on floor of the truck bed. To create an appropriately sized recess, the side walls of the liner must be deep enough to accommodate and hold the restraining member. This reduces the interior width of the bed liner by several inches with respect to the side wall of the vehicle. Support members are usually not formed in the floor of the bed liner to avoid reducing the effective area of the bed and to avoid disturbing the overall flatness of the truck bed liner floor. However, there are portions of the floor of the bed liner which are generally not utilized, such as the area near the wheel well which is often irregular in shape. It would be desireable to utilize this space for cargo restraints.

OBJECTS OF THE INVENTION

Accordingly, it is one object of the present invention to provide a truck bed liner with a cargo restraint system that does not reduce the width of the bed.

It is another object of the present invention to provide a truck bed liner with a cargo restraint system wherein the support members are located on the bed's floor and are integrally formed from the bed liner.

SUMMARY OF THE INVENTION

The invention comprises a truck bed liner for a vehicle cargo bed including a liner floor capable of substantially covering the bottom of the cargo bed and having right and left bottom surfaces and right and left edges. The truck bed liner also includes support members which are formed from the liner floor and protrude upward from the liner floor. Four support members, first and second right support members and first and second left support members, are positioned such that the first right and first left support members are inwardly spaced from the right and left edges of the liner floor, respectively, such that a restraining member may be placed between the right support members and the left support members. The restraining member is held in place by the support members and therefore compartmentalizes the cargo area and provides a mechanism to restrict or inhibit the movement of small or oddly shaped items within the cargo bed without reducing the width of the interior cargo area.

DETAILED DESCRIPTION

Figure 1:
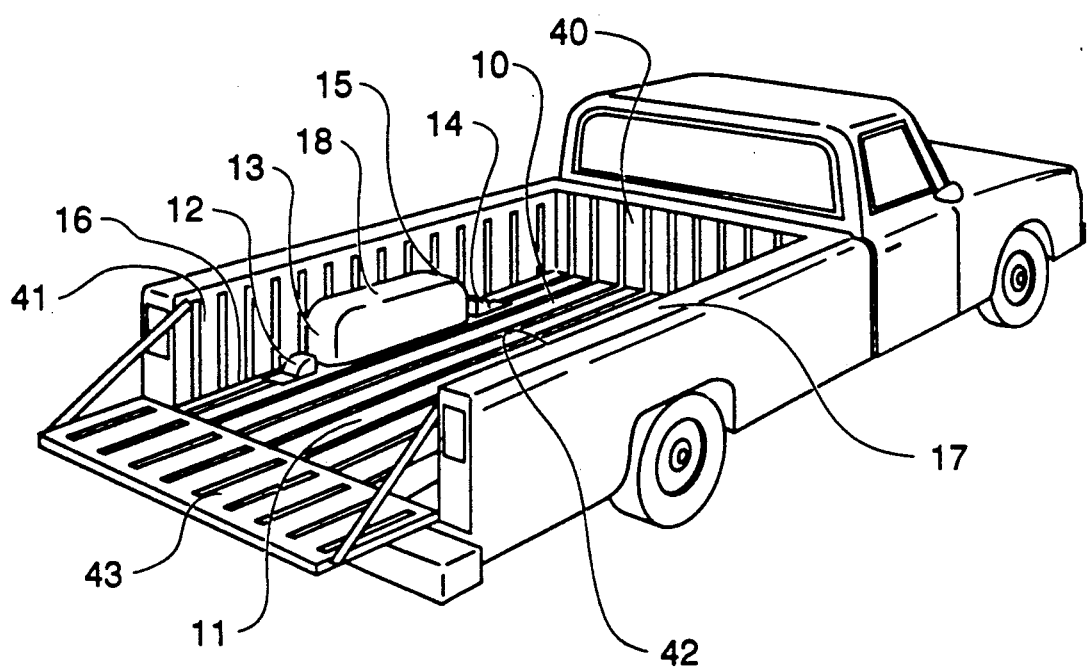
FIG. 1 shows a perspective view of one embodiment of the truck bed liner in accordance with present invention as it is installed in the cargo bed of a pickup truck.

Referring now to FIG. 1, there is shown a perspective view of a truck bed liner in accordance with the present invention in which the truck bed liner is installed in the cargo bed of a pickup truck. Truck bed liner 10 includes liner floor 11 which is capable of substantially covering the bottom of the cargo bed, and support members 12, 13, 14 and 15 near left edge 16 of liner floor 11. Other support members (see FIG. 2A) are located in similar positions with respect to right edge 17 of liner floor 11. All support members 12, 13, 14 and 15 are formed from liner floor 11 and protrude upward from liner floor 11. The entire truck bed liner may be vacuum formed from a single sheet of ABS plastic using methods well-known in the art. First left support members 12, 14 are inwardly spaced from the left edge of floor liner 11. In this embodiment, floor liner 11 has elevated portions which cover the vehicle's opposing wheel wells, left wheel well covering portion 18 and right wheel well (see FIG. 2A), and second left support members 13, 15 are ends of the portion 18 covering wheel well. Truck bed liner 10, constructed from a single piece of synthetic polymeric material, also includes end wall 40, two side walls 41, 42, and tailgate liner 43 each substantially covering the front, sides and tailgate, respectively, of the vehicle's cargo bed. Side walls 41, 42, end wall 40, liner floor 11, and tailgate liner 43 may have ribbed surfaces, as shown, to contribute to the overall structural strength of truck bed liner 10. Side walls 41, 42 may also include a plurality of vertically extending ridges (not shown). The actual dimensions of truck bed liner 10 differ for each make and model of cargo bed into which truck bed liner 10 is to be installed.

Figure 2A:
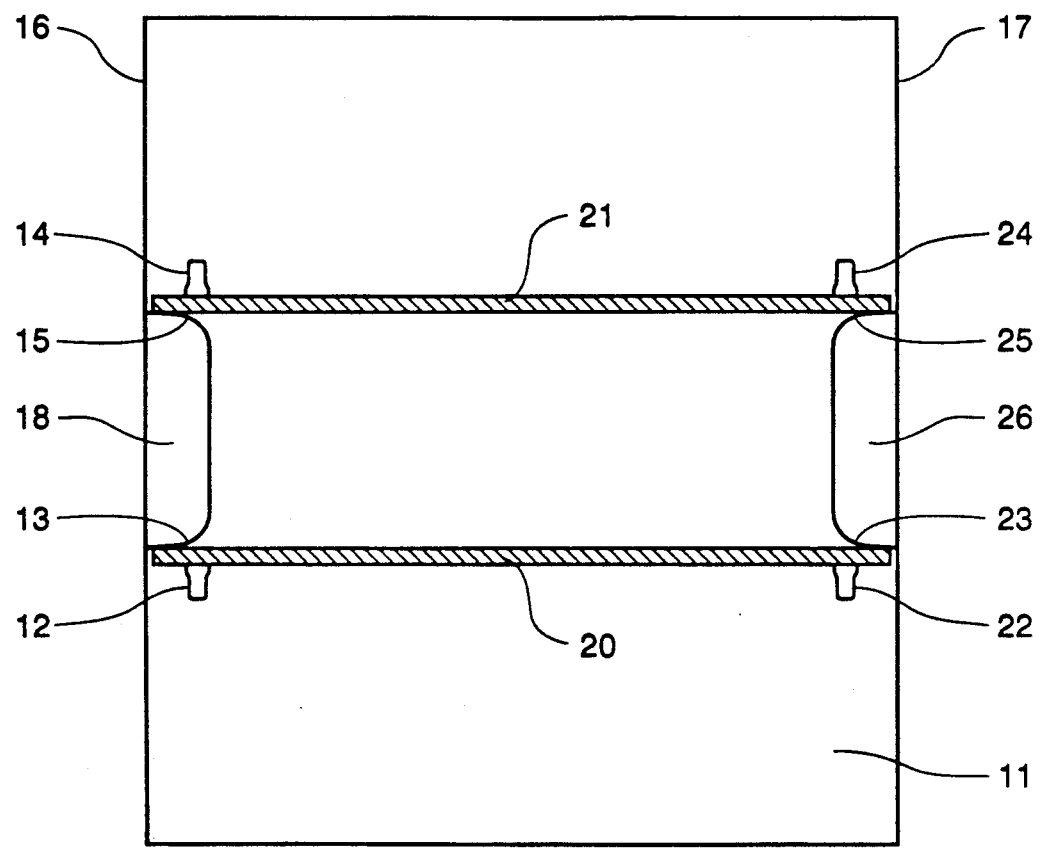
FIG. 2A shows a diagrammatic overhead view of the embodiment of FIG. 1 as it is used to hold two restraining members.

FIG. 2A shows a diagrammatic overhead view of the embodiment shown in FIG. 1. Restraining member 20 is held by first and second left support members 12, 13 and by first and second right support members 22, 23. Second restraining member 21 is held by another set of support members 14, 15 and 24, 25 at the other end of wheel wells 18, 26. In this embodiment, the ends of wheel well covering portion 18 serve as second left support members 14, 24 and the ends of wheel well covering portion 26 serve as second right support members 13, 23.

It will be appreciated by those of skill in the art that restraining members 20, 21 effectively compartmentalize the cargo area into three portions without reducing the interior width of the cargo area. Smaller items may be placed into one of these compartments so that they are less apt to move about the cargo bed when the vehicle is moving. Also, items that may have a tendency to roll about the cargo area may be tied down to restraining members 20, 21.

It will also be appreciated by those of skill in the art that because first support members 12, 14, 22 and 24 are spaced from the edges of the liner, that restraining members 20 and 21 will be less likely to flex under stress than restraining members held in place by prior art support members formed from the side walls of the liner. Moreover, because the support members may be spaced from the right and left edges of the liner, the liner need not necessarily include walls, which normally project upward from the edge of the liner. Eliminating the side walls further increases the available cargo space.

Figure 2B:
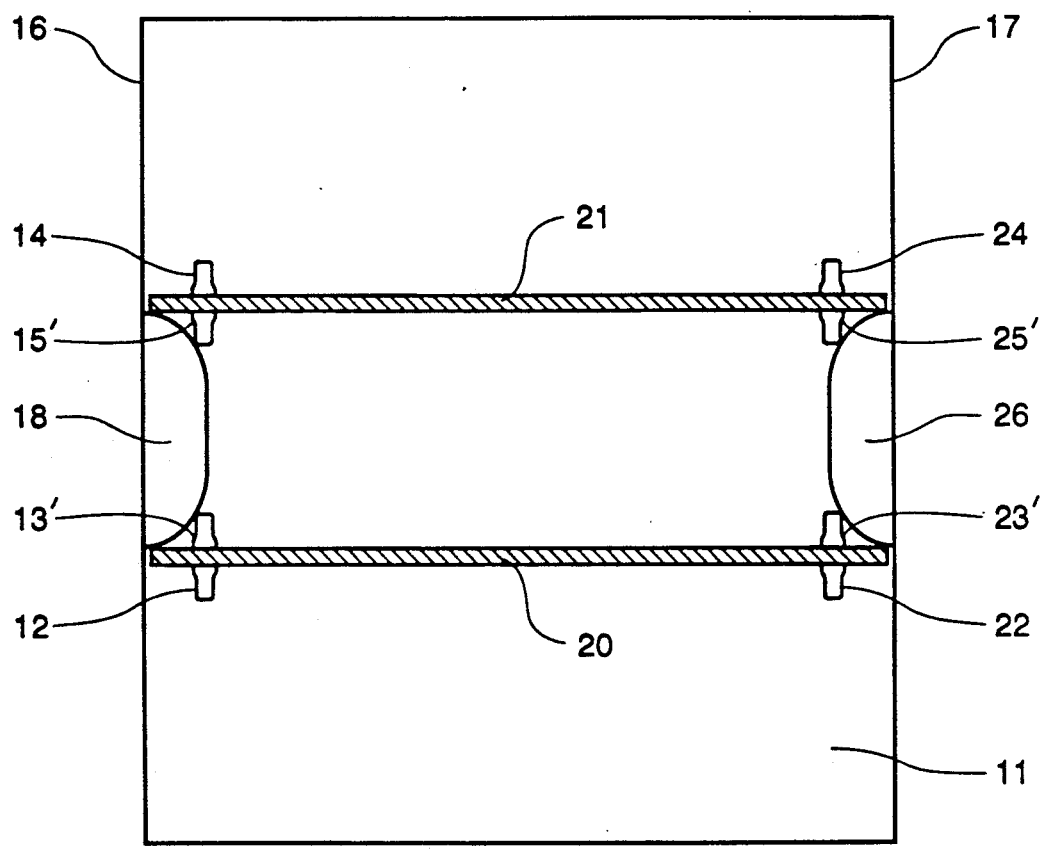
FIG. 2B shows a diagrammatic overhead view of a second embodiment of the present invention in which all support members are separate from the wheel well of the vehicle cargo bed as it is used to hold two restraining members.

A diagrammatic overhead view of a second embodiment is shown in FIG. 2B. Both first 12, 14, 22, 24 support members and second support members 13', 15', 22', 24' are spaced inwardly from edges 16, 17 of liner floor 11. Also, second support members 13', 15', 23', 25' are separate from wheel well covering portions 18, 26 of the vehicle. Each pair of support members, 12 and 13', 14 and 15', 22 and 23' and 24 and 25', are spaced equidistant from the appropriate edges 16, 17 such that each pair of support members face each other. Floor liner 11 need not be extended to cover wheel wells 18, 26 in this embodiment, but may, instead, only substantially cover the floor of the cargo bed.

Figure 3:
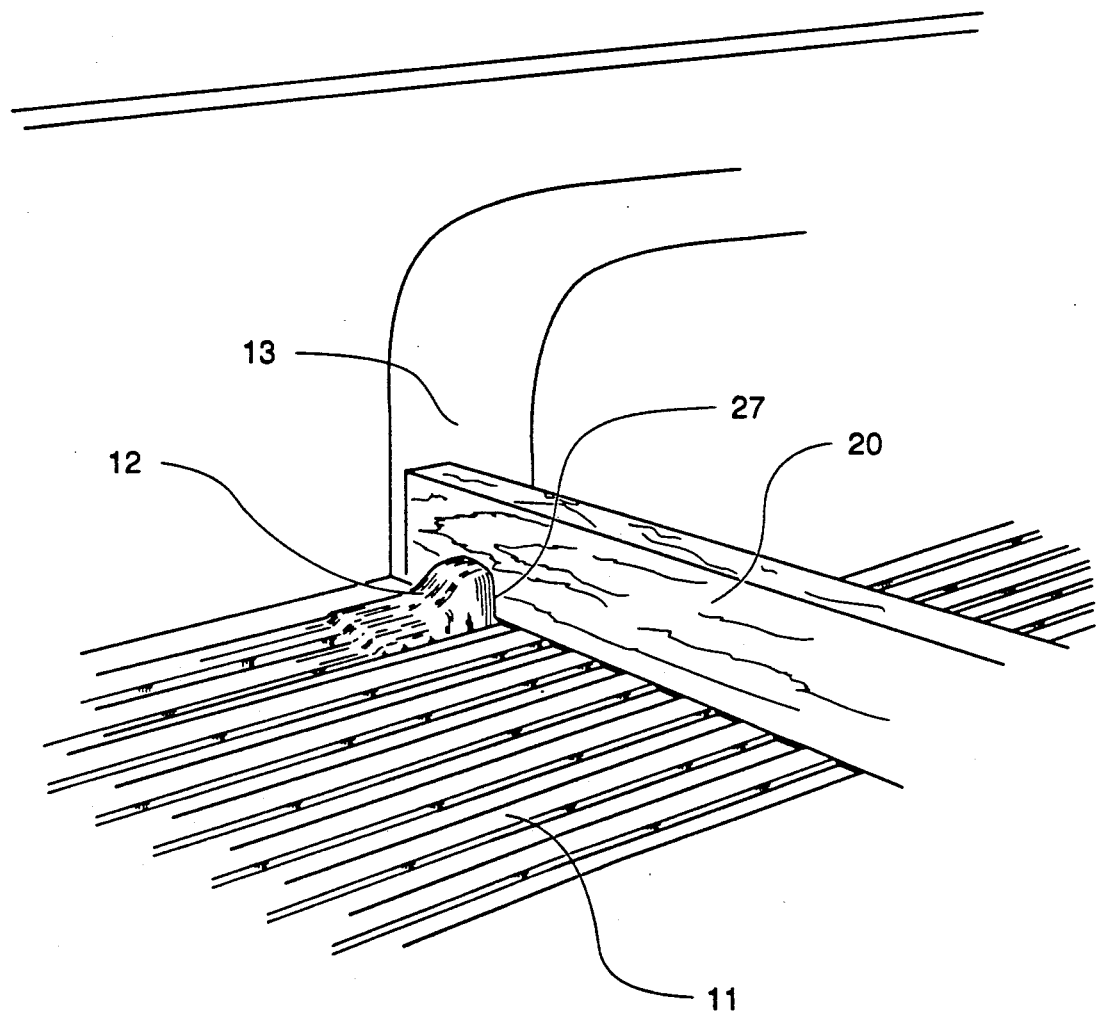
FIG. 3 shows a perspective view of one side of the embodiment of FIG. 1 as it is used to hold a restraining member.

Referring to FIG. 3, there is shown a perspective view of restraining member 20 as it is held between first left support member 13 and second left support member 14. First left support member 13 has flat surface 27, perpendicular to the plane of liner floor 11 and in contact with restraining member 20.

Figure 4A:
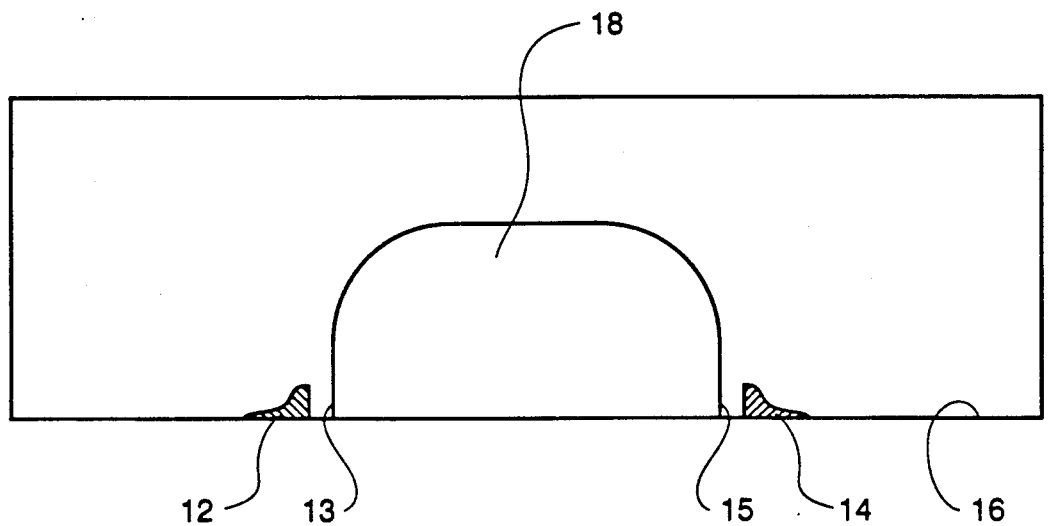
FIG. 4A shows a diagrammatic side view of the embodiment shown in FIG. 1.
Figure 4B:
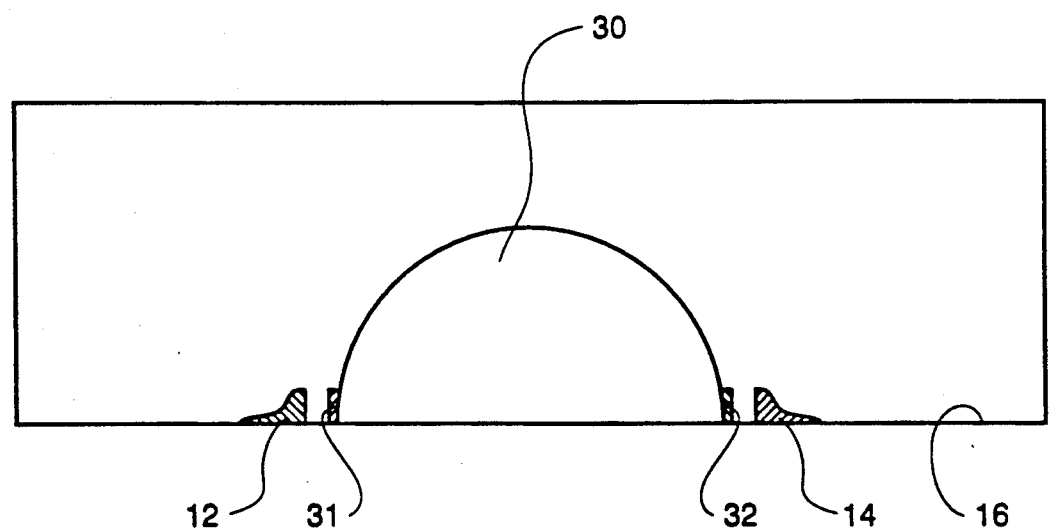
FIG. 4B shows a diagrammatic side view of a third embodiment of the present invention wherein one of the support members is formed as part of the wheel well.
Figure 4C:
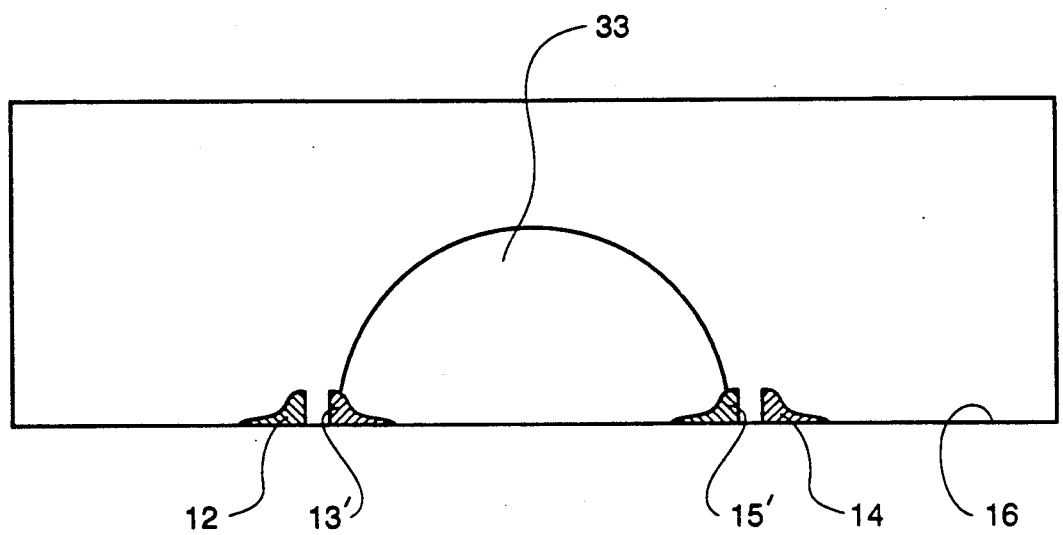
FIG. 4C shows a side view of the embodiment of FIG. 2B of the present invention wherein all support members are separate from the wheel well.

Referring now to FIGS. 4A, 4B and 4C, there is shown diagrammatic side views of three embodiments of the present invention. FIG. 4A shows the two sets of first 12, 14 left and second left 13, 15 support members wherein second left support members 13, 15 are the edges of wheel well covering portion 18. In the second embodiment, wheel well 30 has been modified so that second left support members 31, 32 are formed in the elevated portion of liner floor 11 which covers the cargo bed's wheel well. In FIG. 4C, the embodiment shown in FIG. 2B is illustrated in which second left support members 13', 15' are separate from the wheel well.

It will be appreciated by those of skill in the art that the use of the wheel well covering portions as the second left and right support members may be determined by the specific shape of the vehicle's wheel well. Some wheel wells are rectangular in shape and therefore lend themselves to use as a support member. Other wheel well shapes may not be as accommodating and therefore separate second support members may be used.

It will be further appreciated that the present invention is not limited to locating the support members near the vehicles wheel wells but may be used anywhere on the liner floor. Also, for more rigid support of a restraining member, additional support members disposed between first and second left support members and first and second right support members may be provided.

Finally, the restraining member may be positioned any where from the front of the floor liner to the back of the floor liner if the support members are appropriately placed on the floor liner. As used herein, and in the claims, "truck" is intended to mean any variety of wheeled vehicle, including vans, automobiles and the like.

We claim:

1. A truck bed liner for a vehicle cargo bed comprising
   a liner floor capable of substantially covering the bottom of the cargo bed, the floor liner having right and left bottom surfaces and right and left edges, and
   first and second right support members, and first and second left support members,
   each support member being formed from the liner floor and protruding upward from the liner floor, the support members and the liner floor being of one-piece construction,
   the first right and first left support members being entirely inwardly located from the right and left edges, respectively forming a space therebetween,
   such that a restraining member may be placed between the right support members and the left support members so that the restraining member is held in place by the support members.

2. The truck bed liner of claim 1 wherein one of the surfaces of each support member protruding above the plane of the liner floor is flat and is perpendicular to the plane of the floor liner.

3. The truck bed liner of claim 1 wherein the first and second right support members are spaced equidistant from the right edge of the liner, and the first and second left support members are spaced equidistant from the left edge of the liner.

4. The truck bed liner of claim 1 wherein the second right and second left support members comprise wheel well covering portion.

5. The truck bed liner of claim 1 wherein the liner is formed from a single piece of synthetic polymeric material.

6. The truck bed liner of claim 1 wherein the liner floor comprises elevated portions capable of covering a vehicle's opposing wheel wells.

7. The truck bed liner of claim 6 wherein the second right and second left support members comprise the elevated portions of the liner floor capable of covering a vehicle's wheel wells.

8. The truck bed liner of claim 6 further comprising:
   two side walls capable of substantially covering the sides of a vehicle cargo bed, and
   an end wall capable of substantially covering the front of a vehicle cargo bed.

9. The truck bed liner of claim 8 wherein the liner is formed from a single piece of synthetic polymeric material.

* * * * *